(12) United States Patent
Wu

(10) Patent No.: US 9,441,682 B1
(45) Date of Patent: Sep. 13, 2016

(54) RATCHET MECHANISM FOR A BICYCLE HUB ASSEMBLY

(71) Applicant: King Kong Machinery Co., Ltd., Taiping, Taichung (TW)

(72) Inventor: Stanley Wu, Taiping (TW)

(73) Assignee: King Kong Machinery Co., Ltd., Taiping (TW)

( * ) Notice: Subject to any disclaimer, the term of this patent is extended or adjusted under 35 U.S.C. 154(b) by 0 days.

(21) Appl. No.: 14/693,085

(22) Filed: Apr. 22, 2015

(51) Int. Cl.
*F16D 11/00* (2006.01)
*F16D 41/30* (2006.01)

(52) U.S. Cl.
CPC ..................................... *F16D 41/30* (2013.01)

(58) Field of Classification Search
CPC ...... F16D 41/30; F16D 23/00; F16D 41/063; F16D 41/12; B25B 13/462; B25B 13/465; B25B 13/46
See application file for complete search history.

(56) References Cited

U.S. PATENT DOCUMENTS

| | | | | |
|---|---|---|---|---|
| 5,690,202 | A * | 11/1997 | Myers | F16D 41/12 188/82.7 |
| 6,530,296 | B1 * | 3/2003 | Liao | B25B 13/465 192/43.2 |
| 7,938,241 | B1 * | 5/2011 | Chen | F16D 41/30 192/46 |
| 8,651,257 | B2 * | 2/2014 | Chang | F16D 41/30 192/64 |
| 9,140,317 | B2 * | 9/2015 | Buchanan | B25B 13/461 |
| 2010/0122886 | A1 * | 5/2010 | Chen | F16D 41/30 192/64 |
| 2011/0061490 | A1 * | 3/2011 | Chen | B60B 27/023 74/576 |
| 2011/0148183 | A1 * | 6/2011 | Chen | B60B 27/023 301/110.5 |
| 2011/0168514 | A1 * | 7/2011 | Lee | B60B 27/023 192/64 |
| 2012/0181132 | A1 * | 7/2012 | Kuo | F16D 41/30 192/45.1 |
| 2012/0228923 | A1 * | 9/2012 | Chiang | F16D 41/30 301/110.5 |

* cited by examiner

*Primary Examiner* — David J Hlavka
(74) *Attorney, Agent, or Firm* — C. G. Mersereau; Nikolai & Mersereau, P.A.

(57) ABSTRACT

A hub assembly includes a first and second pawl units respectively connected to the tubular portion of the hub. A toothed collar is mounted to the first and second pawl units, and has ratchet teeth defined therein. The first pawl unit has three first pawls which are located at equal angle to each other. The second pawl unit has three second pawls which are located at equal angle to each other. An angle is defined between the first and second pawls next to each other, and the angle is smaller than the angle of each ratchet teeth of the toothed collar. The first and second pawls are engaged with the ratchet teeth not simultaneously so as to effectively drive the bicycle and the strength of the pawls is maintained.

5 Claims, 4 Drawing Sheets

RATCHET MECHANISM FOR A BICYCLE HUB ASSEMBLY

BACKGROUND OF THE INVENTION (1) Fields of the Invention

The present invention relates to a bicycle hub assembly, and more particularly, to a ratchet mechanism for a bicycle hub assembly.

(2) Descriptions of Related Art

The conventional bicycles generally comprise a front wheel with a chainwheel, and a rear wheel with a sprocket, and a chain is connected between chainwheel and the sprocket. The chainwheel is driven by a crank with two pedals, so that when the cyclist treads the pedals, the crank rotates the chainwheel so as to drive the sprocket via the chain, such that the rear wheel drives the bicycle forward. Some of the bicycles are equipped with a ratchet mechanism connected to the hub on the rear wheel so as to drive the rear wheel when the pedals are treaded forward. When the pedals are treaded backward, the pawls of the ratchet mechanism do not drive the rear wheel backward. The conventional hub assembly has a collar with ratchet teeth defined therein, and the pawls, usually are three, are engaged with the ratchet teeth to drive the bicycle. The pawls are positioned by using a resilient ring. When the pedals are treaded backward, the ratchet teeth push the pawls downward so as not to deliver the force to the rear wheel.

Only three pawls cannot effectively engage the ratchet teeth and drives the collar and the rear wheel. Some manufacturers use six pawls to improve the shortcoming, however, the distances between the six pawls are small so that the resilient ring is expanded and released frequently. Unexpected actions of the pawls may happen to affect the operation of the ratchet mechanism. The resilient ring will be malfunctioned due to the frequent actions. The height of the pawls and strength are reduced along with the increase of the number of the pawls are used. The pawls may skip from the engagement with the ratchet teeth, and the pawls may be broken.

The distance between the pawls, the interference of the frequent actions of the resilient ring, and the strength of the pawl become concerns of the manufacturers.

The present invention intends to provide a ratchet mechanism for improving the shortcomings mentioned above.

SUMMARY OF THE INVENTION

The present invention relates to a hub assembly and comprises a hub having a passage defined axially therethrough, and an axle extends through the passage. A sprocket seat is connected to one end of the hub and mounted to the axle. The sprocket seat has a tubular portion extending therefrom. A first pawl unit and a second pawl are respectively connected to the outside of the tubular portion. The first pawl unit has three first recesses defined axially in the outside of the tubular portion. The first recesses are located at an equal angle to each other. The first recesses form three protrusions on the tubular portion and the protrusions are located alternatively between the first recesses. Each protrusion has a first positioning groove defined therein. Each first recess receives a first pawl therein. Each first pawl has a first restriction groove defined therein which communicates with the first positioning grooves. A first ring is mounted to the first pawls and engaged with the first restriction grooves.

The second pawl unit has three second recesses defined axially in the outside of the tubular portion. The second recesses are located at an equal angle to each other. Each second recess is located next to one of the first recesses and has an angle defined therebetween. Each protrusion has a second positioning groove defined therein. Each second recess receives a second pawl therein. Each second pawl has a second restriction groove defined therein which communicates with the second positioning grooves. A second ring is mounted to the second pawls and engaged with the second restriction grooves. A toothed collar is mounted to the tubular portion and has ratchet teeth defined therein. The first and second pawls are engaged with the ratchet teeth not simultaneously.

The primary object of the present invention is to provide a ratchet mechanism for a bicycle hub and which users two sets of the pawls to be engaged with the toothed collar so as to have better driving feature.

Another object of the present invention is to provide a ratchet mechanism for a bicycle hub, wherein the two sets of the pawls are engaged with the ratchet teeth no simultaneously such that the two sets of the pawls have a longer lifetime.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
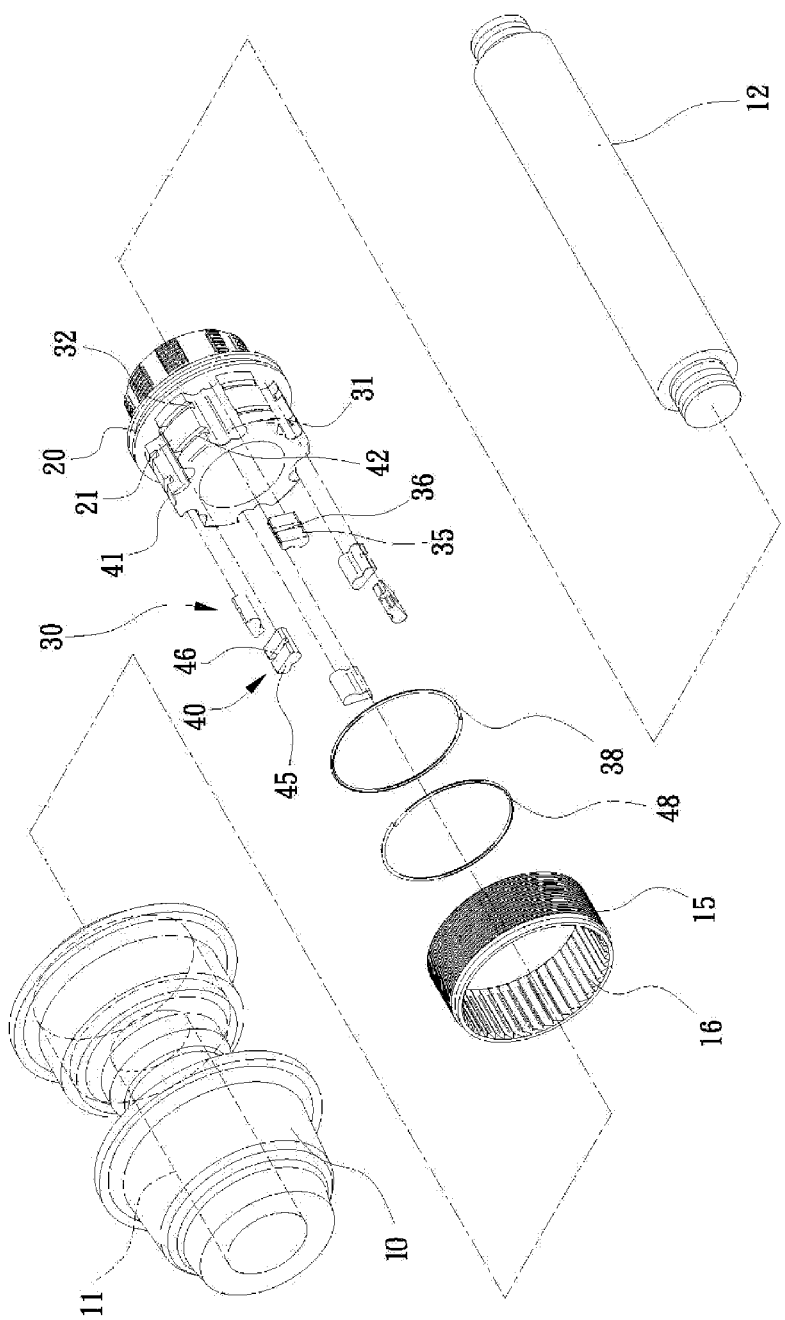
FIG. 1 is an exploded view to show the ratchet mechanism of the bicycle hub of the present invention.
Figure 2:
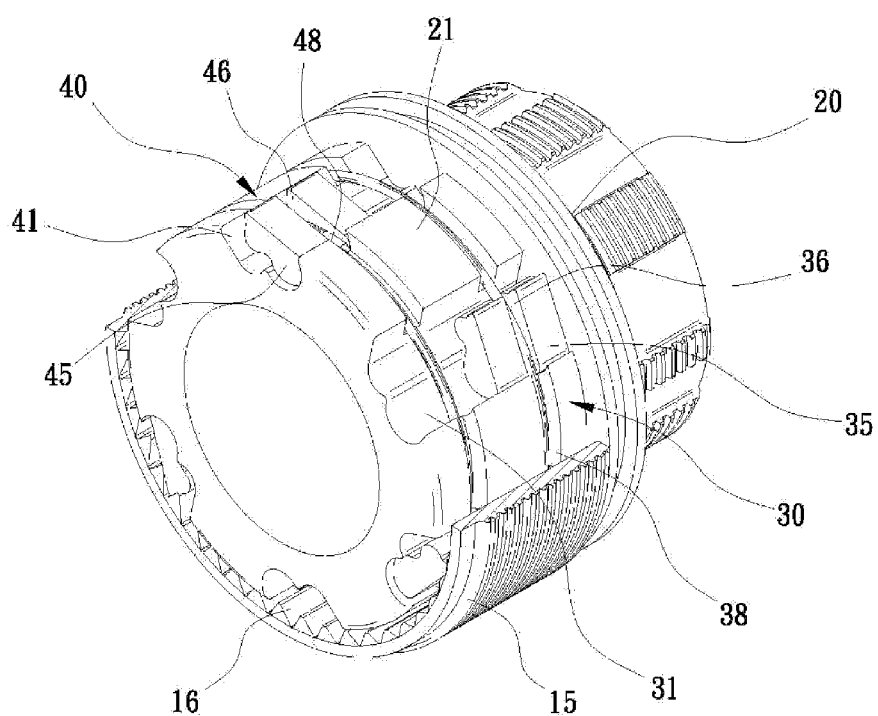
FIG. 2 is a perspective view to show the ratchet mechanism of the bicycle hub of the present invention.

Referring to FIGS. 1 and 2, the bicycle hub assembly of the present invention comprises a hub 10 having a passage 11 defined axially therethrough. An axle 12 extends through the passage 11. A sprocket seat 20 is connected to one end of the hub 10 and mounted to the axle 12. The sprocket seat 20 has a tubular portion 21 extending therefrom. The hub 10 is connected with multiple spokes (not shown) which are connected with a rim (not shown) to form a wheel (not shown). A toothed collar 15 is mounted to the tubular portion 21 and has ratchet teeth 16 defined therein. The ratchet teeth 16 are located at equal angle to each other.

A first pawl unit 30 and a second pawl unit 40 are respectively connected to the outside of the tubular portion 21. The first pawl unit 30 comprises three first recesses 31 defined axially in the outside of the tubular portion 21, and the first recesses 31 are located at an equal angle (60 degrees) to each other. The first recesses 31 form three protrusions on the tubular portion 21 and the protrusions are located alternatively between the first recesses 31. Each protrusion has a first positioning groove 32 defined therein. Each first recess 31 receives a first pawl 35 therein, and each first pawl 35 has a first restriction groove 36 defined a top surface therein which communicates with the first positioning grooves 32. A first ring 38 which is a resilient ring is mounted to the first pawls 35 and engaged with the first restriction grooves 36 to position the first pawls 35. The first ring 38 provides a force to return the first pawls 35 when the first pawls 35 are pressed by the ratchet teeth 16.

The second pawl unit 40 comprises three second recesses 41 defined axially in the outside of the tubular portion 21. The second recesses 41 are located at an equal angle (60 degrees) to each other. Each second recess 41 is located next to one of the first recesses 31 and has an angle defined therebetween. The angle between each of the second recess 41 and the first recess 31 is smaller than the angle of each ratchet tooth 16. For example, the toothed collar 15 has 45 ratchet teeth 16 and each ratchet teeth 16 has an angle of 8 degrees. The angle between the first pawl 35 and the second pawl 45 is 2 to 6 degrees. Preferably, the angle between the first pawl 35 and the second pawl 45 is 4 degrees.

Each protrusion has a second positioning groove 42 defined therein. Each second recess 41 receives a second pawl 45 therein, and each second pawl 45 has a second restriction groove 46 defined therein which communicates with the second positioning grooves 42. A second ring 48 which is a resilient ring, is mounted to the second pawls 45 and engaged with the second restriction grooves 46. The second ring 48 provides a force to return the second pawls 45 when the second pawls 45 are pressed by the ratchet teeth 16.

The toothed collar 15 mounted to the tubular portion 21 and located among the first and second pawls 35, 45 which are engaged with the ratchet teeth 16 not simultaneously. Therefore, the present invention does not need to change the toothed collar 15, and the first and second pawls 35, 45 are engaged with the ratchet teeth 16 of the toothed collar 15 to increase the efficiency for driving the toothed collar 15, while the strength of the first and second pawls 35, 45 is maintained.

Figure 3:
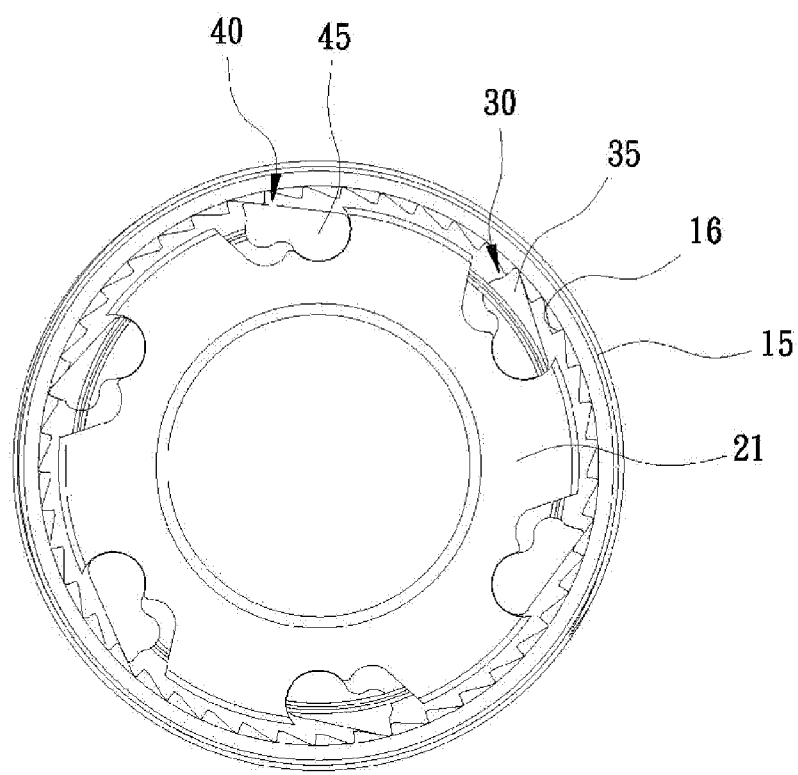
FIG. 3 is an end view to show that the first pawls are engaged with the ratchet teeth while the second pawls are not yet engaged with the ratchet teeth.
Figure 4:
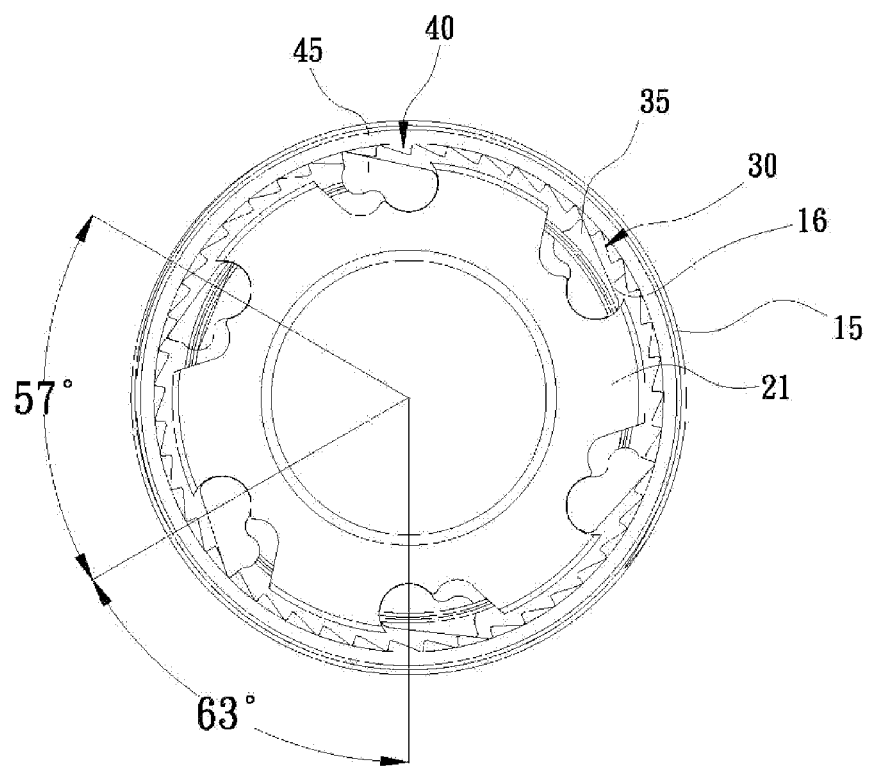
FIG. 4 is an end view to show that the second pawls are engaged with the ratchet teeth while the first pawls are not yet engaged with the ratchet teeth.

As shown in FIGS. 3 to 4, because the first and second pawls 35, 45 have an angle defined therebetween, so that when the pedals are treaded forward, the first pawls 35 are engaged with the ratchet teeth 16 of the toothed collar 15, and the second pawls 45 are pushed downward by the ratchet teeth 16 of the toothed collar 15 while the second ring 48 stores a bouncing force.

When the pedals are rotated in backward, the first pawls 35 are disengaged from the ratchet teeth 16 of the toothed collar 15. When the pedals are rotated forward again, the second pawls 45 are engaged with the ratchet teeth 16 of the toothed collar 15. By this way, the gap between the sprocket seat 20 and the hub 10 can be reduced, and the efficiency for driving the bicycle is increased.

The size of the ratchet teeth 16 of the toothed collar 15 are maintained the desired size to have better strength, so that the first and second pawls 35, 45 do not skip or broken, and the wearing of the first and second pawls 35, 45 are reduced.

While we have shown and described the embodiment in accordance with the present invention, it should be clear to those skilled in the art that further embodiments may be made without departing from the scope of the present invention.

What is claimed is:

1. A hub assembly comprising:
   a hub having a passage defined axially therethrough, an axle extending through the passage;
   a sprocket seat connected to an end of the hub and mounted to the axle, the sprocket seat having a tubular portion extending therefrom;
   a first pawl unit and a second pawl respectively connected to an outside of the tubular portion, the first pawl unit having three first recesses defined axially in the outside of the tubular portion, the first recesses being located at an equal angle to each other, the first recesses forming three protrusions on the tubular portion and the protrusions being located alternatively between the first recesses, each protrusion having a first positioning groove defined therein, each first recess receiving a first pawl therein, each first pawl having a first restriction groove defined therein which communicates with the first positioning grooves, a first ring mounted to the first pawls and engaged with the first restriction grooves;
   the second pawl unit having three second recesses defined axially in the outside of the tubular portion, the second recesses being located at an equal angle to each other, each second recess being located next to one of the first recesses and having an angle defined therebetween, each protrusion having a second positioning groove defined therein, each second recess receiving a second pawl therein, each second pawl having a second restriction groove defined therein which communicates with the second positioning grooves, a second ring mounted to the second pawls and engaged with the second restriction grooves, and
   a toothed collar mounted to the tubular portion and having ratchet teeth defined therein, the first and second pawls engaged with the ratchet teeth being not simultaneously.

2. The hub assembly as claimed in claim 1, wherein the hub is connected with multiple spokes which are connected with a rim to form a wheel.

3. The hub assembly as claimed in claim 1, wherein the toothed collar has 45 ratchet teeth and each ratchet teeth has an angle of 8 degrees, an angle between the first pawl and the second pawl is 2 to 6 degrees.

4. The hub assembly as claimed in claim 3, wherein the angle between the first pawl and the second pawl is 4 degrees.

5. The hub assembly as claimed in claim 1, wherein the angle between the first pawl and the second pawl is 4 degrees.

* * * * *